United States Patent [19]
Anderton et al.

[11] Patent Number: 6,074,022
[45] Date of Patent: Jun. 13, 2000

[54] TRACK BUSHING HAVING ARC WELDED END TREATMENT FOR IMPROVED ABRASION AND CORROSION RESISTANCE, AND A PROCESS FOR MAKING THE SAME

[75] Inventors: Peter W. Anderton; Brett A. Jones, both of Peoria, Ill.

[73] Assignee: Caterpillar Inc., Peoria, Ill.

[21] Appl. No.: 09/046,378

[22] Filed: Mar. 23, 1998

[51] Int. Cl.[7] .................................................. B62D 55/00
[52] U.S. Cl. ........................ 305/103; 305/101; 305/102; 305/104; 305/105; 305/106
[58] Field of Search .................................... 305/100, 101, 305/102, 103, 104, 105, 106, 202, 203, 204; 384/912, 913, 625

[56] References Cited

U.S. PATENT DOCUMENTS

| | | | |
|---|---|---|---|
| 3,109,920 | 11/1963 | King . | |
| 4,218,494 | 8/1980 | Belmondo et al. | 427/35 |
| 4,295,654 | 10/1981 | Kawamura et al. | 305/101 |
| 4,383,478 | 5/1983 | Jones | 98/59 |
| 4,469,336 | 9/1984 | Linne | 277/92 |
| 4,505,485 | 3/1985 | Hirakawa | 277/96.1 |
| 4,594,846 | 6/1986 | Livesay et al. | 59/5 |
| 4,688,805 | 8/1987 | Crotti et al. | 277/381 |
| 4,689,463 | 8/1987 | Shubert | 219/76.16 |
| 4,819,999 | 4/1989 | Livesay et al. | 305/103 |
| 4,848,934 | 7/1989 | Blakely et al. | 384/625 |
| 4,878,953 | 11/1989 | Saltzman et al. | 148/4 |
| 4,982,066 | 1/1991 | Waring | 219/137 |
| 5,205,188 | 4/1993 | Repenning et al. | 74/569 |
| 5,226,975 | 7/1993 | Denton et al. | 148/220 |
| 5,257,858 | 11/1993 | Taft | 305/104 |
| 5,299,731 | 4/1994 | Lyanage et al. | 228/219 |
| 5,449,547 | 9/1995 | Miyazaki et al. | 428/217 |
| 5,554,415 | 9/1996 | Turchan et al. | 427/248.1 |
| 5,593,234 | 1/1997 | Liston | 384/492 |

FOREIGN PATENT DOCUMENTS

| | | | |
|---|---|---|---|
| 0456847 | 5/1990 | European Pat. Off. | C23C 4/12 |
| 0608543 | 12/1993 | European Pat. Off. . | |
| 53-148657 | 12/1978 | Japan | F16J 15/34 |
| 1572963 | 8/1980 | United Kingdom | B62D 55/20 |
| WO8900523 | 1/1989 | WIPO | B62D 55/88 |

Primary Examiner—S. Jospeh Morano
Assistant Examiner—Long B. Nguyen
Attorney, Agent, or Firm—Kevin M. Kercher; Jenkins & Gilchrist

[57] ABSTRACT

A track bushing for an endless track of a track-type machine includes a cylindrical tubular shape having a first end and a second end and a longitudinal axis. The track bushing further includes a first end bearing surface that is adjacent to the first end and a second end bearing surface that is adjacent to the second end. A circumferential groove is formed in at least one of the first end bearing surface and the second end bearing surface. The circumferential groove has a depth along the longitudinal axis. An abrasion and corrosion resistant material is arc welded within the circumferential groove to the bushing at a weld joint.

13 Claims, 3 Drawing Sheets

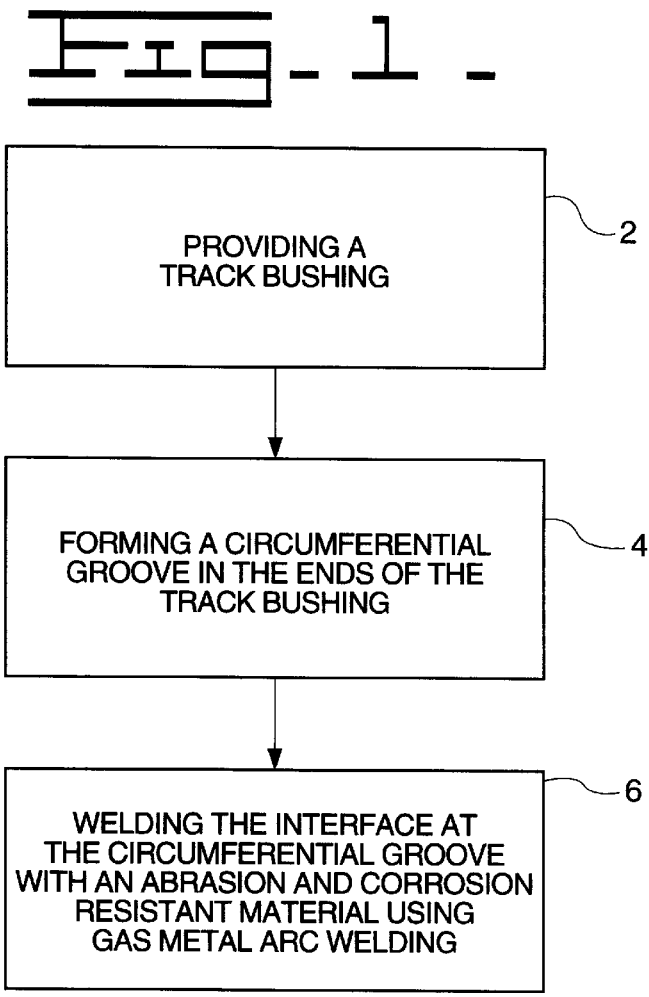
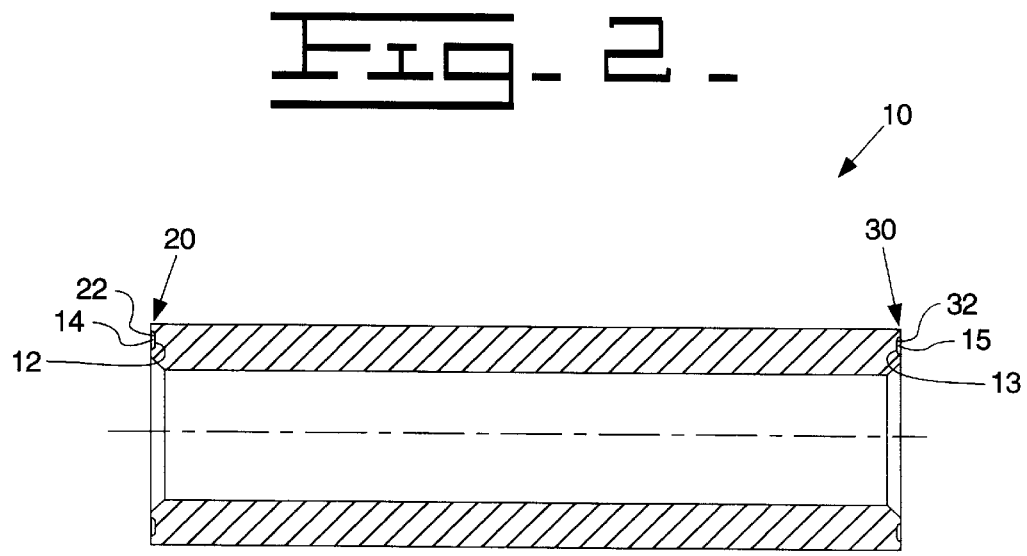

TRACK BUSHING HAVING ARC WELDED END TREATMENT FOR IMPROVED ABRASION AND CORROSION RESISTANCE, AND A PROCESS FOR MAKING THE SAME

TECHNICAL FIELD

The present invention relates generally to track bushings for the endless tracks of a track-type machine, and more particularly to a track bushing having arc welded end treatment for improved abrasion and corrosion resistance and a process for making the same.

BACKGROUND ART

Track bushings are used with the track pins for linking the track links for an endless track of a track-type machine. A nonlimiting example of a track-type machine would be one that is utilized in earthmoving. Consequently, these track-type machines can be subjected to a very severe operating environment.

The track bushing has two ends that are adjacent to an inner surface. The two ends of a track bushing and the inner surface collectively form a main bearing surface that slides against a track seal and a track pin, respectively. Dirt and debris tend to wear the ends of the track bushing that slide against the sealing surface of the track seal. This happens because the dirt and debris can become lodged between the seal and the end surfaces of the track bushing and eventually wear a groove into the end surfaces of the track bushing. The formation of this wear groove causes oil to leak out of the pin joint assembly that leads to an eventual failure of the pin joint. In addition, this wear will also result in the pin joint becoming exposed to the elements and eventually corroding.

The present invention is directed to overcoming one or more of the problems set forth above.

DISCLOSURE OF THE INVENTION

In one aspect of the present invention, a track bushing for an endless track of a track-type machine, is disclosed. The track bushing includes a cylindrical tubular shape having a first end and a second end and a longitudinal axis. The track bushing further includes a first end bearing surface that is adjacent to the first end and a second end bearing surface that is adjacent to the second end. A circumferential groove is formed in at least one of the first end bearing surface and the second end bearing surface. The circumferential groove has a depth along the longitudinal axis. An abrasion and corrosion resistant material is arc welded within the circumferential groove of the track bushing at a weld joint.

In another aspect of the present invention, a process for making a corrosion resistant track bushing for an endless track of a track-type machine is disclosed. The process includes the following steps. Providing a track bushing, having a cylindrical tubular shape and a longitudinal axis, including both a first end and a second end with a first end bearing surface adjacent to the first end and a second end bearing surface adjacent to the second end. A circumferential groove is formed in at least one of the first end bearing surface and the second end bearing surface. The circumferential groove has a depth along the longitudinal axis. An abrasion and corrosion resistant material is welded within the circumferential groove of the track bushing at a weld joint by arc welding techniques.

BRIEF DESCRIPTION OF THE DRAWINGS

FIG. 1 is a schematic flow diagram of the process of the present invention;

FIG. 2 is a sectional side view of a track bushing of the present invention;

BEST MODE FOR CARRYING OUT THE INVENTION

Figure 3:
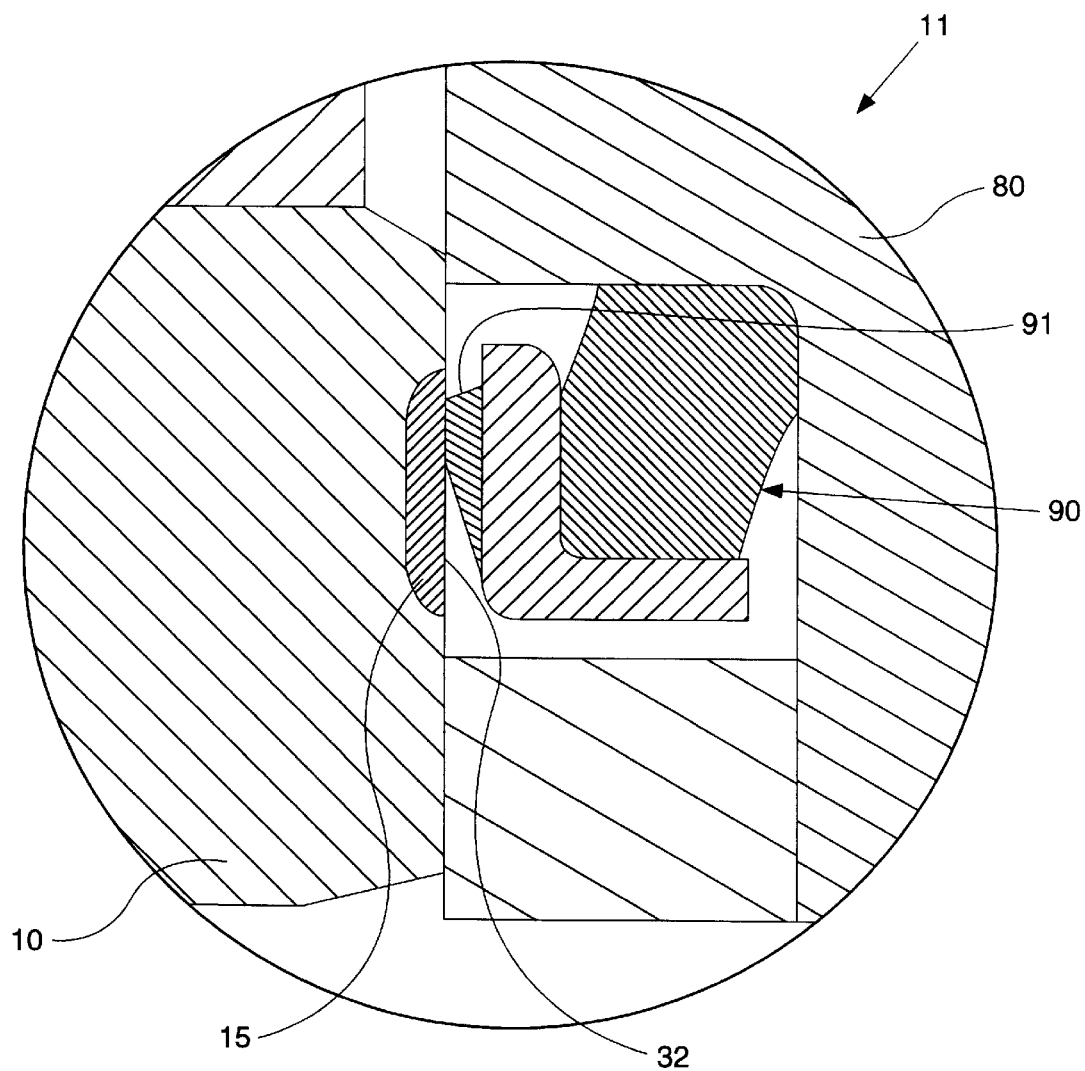
FIG. 3 is a sectional side view of the track bushing of FIG. 2 in sealing engagement with a track seal affixed within a track link.

Referring now to FIG. 1, which shows a schematic of a process for making an abrasion and corrosion resistant track bushing for an endless track of a track-type machine, and FIG. 2 that shows a sectional side view of a track bushing of the present invention. In the description of the flow diagram, the functional explanation marked with numerals in angle brackets, <nnn>, will refer to the flow diagram blocks of FIG. 1 bearing that number. The process includes the steps of providing a track bushing 10 having a cylindrical tubular shape with a first end 20 and a second end 30 and a longitudinal axis <2>. There is a first end bearing surface 22 that is adjacent to the first end 20 and a second end bearing surface 32 that is adjacent to the second end 30. Preferably, a circumferential groove is formed in both the first end bearing surface 22 and the second end bearing surface 32, as shown in FIG. 2, and indicated by numerals 12 and 13, respectively <4>. It is desirable for the circumferential grooves 12 and 13 to have depth along the longitudinal axis.

The process further includes the step of utilizing gas metal arc welding <6> for depositing an abrasion and corrosion resistant material within the circumferential grooves 12 and 13. The preferred type of gas metal arc welding is that which is pulsed. Although the present invention is directed towards gas metal arc welding, it could be directed to gas tungsten welding. Gas tungsten arc welding creates an arc between an unconsumed tungsten electrode and the track bushing 10 so that the arc is shielded by inert gas and the heat of the arc melts the abrasion and corrosion resistant material without melting the tungsten electrode.

The term "weld interface", as used herein, means the area between the track bushing substrate and the abrasion and corrosion resistant weld material. This weld interface is metallurgically formed when the abrasion and corrosion resistant material and the track bushing substrate are heated above their melting temperature and then allowed to coalesce during solidification.

The term "fusion zone", as used herein, means the area where the track bushing substrate and the abrasion and corrosion resistant weld material are melted together and includes the actual abrasion and corrosion resistant material melted and fused to the track bushing substrate.

The term "gas metal arc welding" as used herein refers to a process that utilizes a power supply to provide electrical characteristics to establish a high temperature arc to melt the abrasion and corrosion resistant weld material, a wire feeding system to feed the abrasion and corrosion resistant weld material in wire form, a welding torch and cable assembly that guides the abrasion and corrosion resistant weld material to the circumferential grooves 12 and 13, and a shielding gas supply that blankets the weld joint during the weld process to prevent atmospheric contamination as the weld solidifies and cools.

The preferred type of gas metal arc welding is pulsed so that the current and voltage go from low background levels to higher peak levels. The overall current and voltage level will be lower than steady-state gas metal arc welding. This will reduce the amount of heat generated during welding while retaining favorable metal transfer modes that are comparable with steady-state gas metal arc welding. Pulsed gas metal arc welding reduces spatter as well as the detrimental effects resulting from the application of high heat. The high application of heat can result in distortion. In addition, microstructural changes can occur that lead to changes in the mechanical properties of the track bushing so that the residual stress level can become as high as the yield strength in some materials. The overall effect of high heat exposure is a tempering that can result in a softer material that can gall during assembly. It has been found that the process of the present invention allows for the abrasion and corrosion resistant weld to be formed on the track bushing while minimizing the potential for the tempering of the track bushing compared to other types of welding processes.

In the nonlimiting example of the preferred embodiment, the welding power supply utilizes an inverter-type power source as opposed to a silicon controlled rectifier power source so that there is a fast enough response to form a pulse waveform. The wire feeder is microprocessor controlled so that pulsing programs can be set-up and stored. The preferred type of gas is a 98% argon and 2% oxygen mixture. The desired wire is stainless steel that is steel alloyed with nickel and molybdenum. The preferred type of stainless steel is that defined as "martensitic", which provides superior abrasion resistant qualities as opposed to other types of stainless steel. The preferred type of martensitic stainless steel is that designated as "410". One particular, illustrative type of martensitic stainless steel has a composition by weight percent comprising:

carbon 0.06 maximum chromium 11.0 to 12.5 nickel 4.0 to 5.5 molybdenum 0.4 to 0.7 manganese 1.00 maximum silicon 0.90 maximum phosphorous 0.03 maximum sulfur 0.03 maximum copper 0.75 maximum iron remainder of composition.

There are a number of nonlimiting parameters in the preferred pulsed gas metal arc welding process. These parameters are for track bushing ends having a weld joint with a depth below the surface of the track bushing that can range from about 2.103 millimeters (0.082 inches) to about 4.951 millimeters (0.193 inches) and preferably ranges from about 2.513 millimeters (0.098 inches) to about 4.513 millimeters (0.176 inches). The width of the weld joint can range from about 6.308 millimeters (0.246 inches) to about 13.205 millimeters (0.515 inches) and preferably ranges from about 2.744 millimeters (0.273 inches) to about 12.0 millimeters (0.468 inches). The reinforcement height of the weld joint above the surface of the track bushing can range from about 0.897 millimeters (0.0351 inches) to about 2.744 millimeters (0.107 inches) and preferably ranges from about 1.0 millimeters (0.0390 inches) to about 2.513 millimeters (0.0975 inches).

Some of the other physical parameters include a preferred wire diameter can range from about 0.513 millimeters (0.020 inches) to about 1.333 millimeters (0.052 inches), with a preferred wire diameter of about 1.154 millimeters (0.045 inches). Wire feed speed can range from about 5.128 meters (200 inches) to about 10.256 meters (400 inches) per minute, with a preferred range from about 5.641 meters (220 inches) to about 9.744 meters (380 inches) per minute. Travel speed can range from about 512.8 millimeters (20 inches) to about 769.2 millimeters (30 inches) per minute, with a preferred range from about 487.2 millimeters (19 inches) to about 743.6 millimeters (29 inches) per minute. Trim can range from about 52 to about 80, with a preferred range from about 55 to about 77. Electrical stickout can range from about 11.8 millimeters (0.5 inches) to about 21.8 millimeters (0.9 inches), with a preferred range from about 12.8 millimeters (0.5 inches) to about 20.8 millimeters (0.8 inches). Shielding gas flow rate can range from about 7.6 cubic meters (30 cubic feet) to about 12.7 cubic meters (50 cubic feet) per hour, with a preferred range from about 8.1 cubic meters (32 cubic feet) to about 12.2 cubic meters (48 cubic feet) per hour.

There are also numerous electrical operating parameters. The peak voltage can range from about 26 to about 35.5 volts, with a preferred range from about 27 to about 34.5 volts. The peak current can range from about 380 to about 430 amperes, with a preferred range from about 385 to about 425 amperes. The background current can range from about 70 to about 150 amperes, with a preferred range from about 78 to about 142 amperes. The pulses per second can range from about 90 to about 210, with a preferred range from about 102 to about 198. The pulse width in relation to time can range from about 2.0 to about 2.7 milliseconds, with a preferred range from about 2.07 to about 2.63 milliseconds. Weld parameters apart from the outer limits recited above will result in weld joint deemed inadequate for a track bushing application.

Referring now to FIG. 3, one end of the track bushing 10 for an endless track of a track-type machine is shown in a sealing engagement with a track seal 90. FIG. 3 shows an arrangement 11 that includes the track bushing 10 having an abrasion and corrosion resistant material 15 welded in the circumferential groove 13 at one of the bearing ends 32. The track bushing 10 has the first end 20 adjacent to the first end bearing surface 22 and the second end 30 adjacent to the second end bearing surface 32, as shown in FIG. 2. In the preferred embodiment, abrasion and corrosion resistant material 14 is deposited in the circumferential groove 12 and abrasion and corrosion resistant material 15 is deposited in the circumferential groove 13. The circumferential grooves 12 and 13 are adjacent to the first end bearing surface 22 and the second end bearing surface 32, respectively. In addition, FIG. 3 shows a track bushing 10 where the abrasion and corrosion resistant weld material 15 is deposited in groove 13 is in sealing engagement with the track seal 90 that has a sealing lip 91. The seal is fixed in a track link 80. As can be seen from FIG. 3, it is preferred that the sealing engagement between the track bushing 10 and the track seal 90 occurs at the abrasion and corrosion resistant weld 15 of the track bushing 10.

Figure 4:
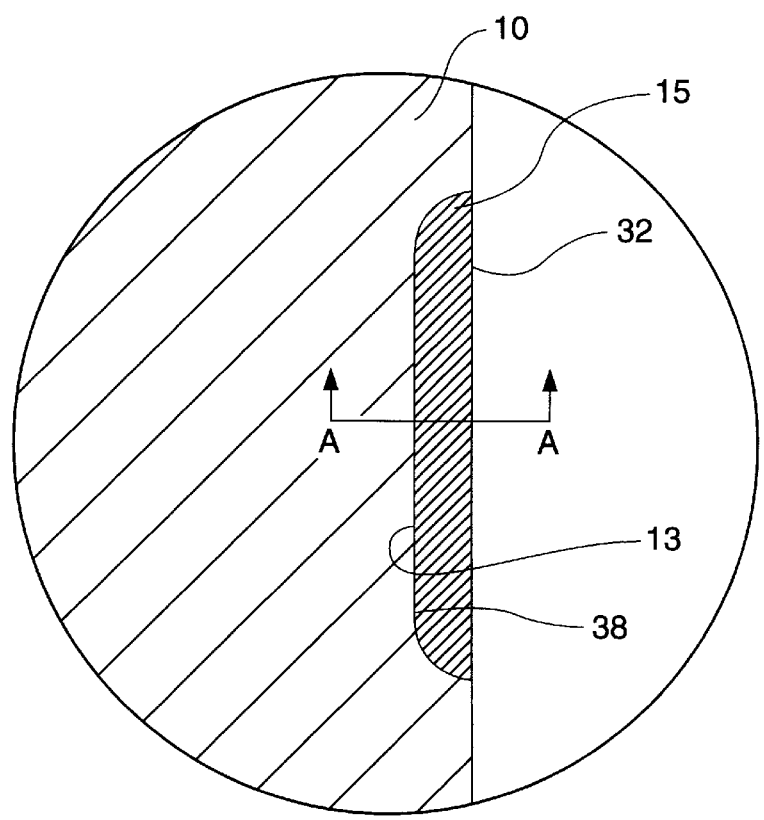
FIG. 4 is a sectional side view of an enlarged portion of a bearing end of the track bushing of FIG. 2.

Referring now to FIG. 4, which shows a magnified sectional side view of the second bearing end 32 having the gas metal arc welded and corrosion resistant steel material, the weld interface between the abrasion and corrosion resistant and the track bushing is shown by numeral 38.

Figure 5:
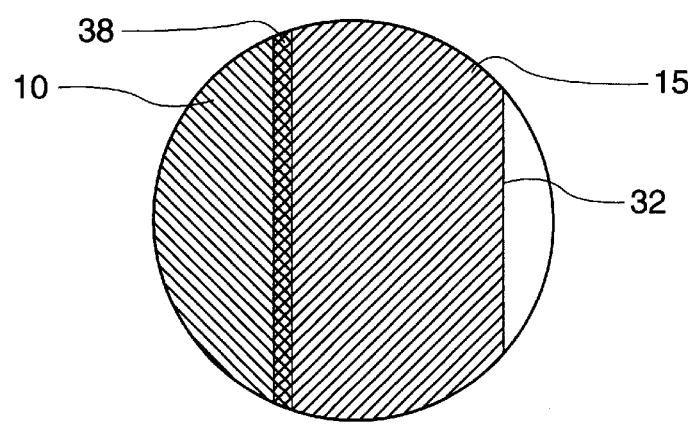
FIG. 5 is a magnified view of the detail A—A shown in FIG. 4, showing the detail of a weld joint, according to the present invention.

FIG. 5 shows a magnified section of FIG. 4, where the fusion zone includes a composition that is a mixture of the track bushing material and the abrasion and corrosion resistant material.

In the preferred embodiment, the pulsed gas metal arc weld is free of defects such as cracks or porosity and has a polished surface having a Rockwell C hardness in the range of about RC 52 to about RC 58 with the preferred value being about RC 55. The process of the present invention is useful for manufacturing new track bushings or for the refurbishment of used track bushings.

EXAMPLE

Referring now to FIG. 1, a track bushing 10 has the pair of circumferential grooves 12 and 13 each having a depth of 1.539 millimeters (0.06 inches) and a width of 6.154 millimeters (0.24 inches). These circumferential grooves 12 and 13 are welded under the following parameters:
Power Supply: Inverter-type
Wire Feed: Microprocessor-controlled
Shielding Gas: 98% Argon and 2% Oxygen
Wire Feed Speed: 9.359 meters
 (365 inches) per minute
Trim: 80
Electrical Stickout: 19.23 millimeters
 (0.75 inches)
Shielding Gas Flow: 10.178 cubic meters
 (40 cubic feet) per hour
Wire type: martensitic stainless steel
Wire diameter: 1.15 millimeters
 (0.045 inches)
Peak Voltage: 31.5 volts
Peak Current: 390 currents
Background Current: 116 amperes
Pulses per second: 180
Pulse width: 2.3 milliseconds
Downhill Angle: 30 degrees
Torch Angle: 15 degree pull off
 longitudinal bashing axis
Work Angle: 0 to 3 degrees The above parameters provide a very strong weld that significantly reduces both abrasion and corrosion.

Industrial Applicability

The present invention is particularly useful for improving the abrasion and corrosion resistance of track bushings used with the track pins for linking the track links for an endless track of a track-type machine, for example, such as one used for earthmoving.

An abrasion and corrosion resistant material is applied to the ends of track bushing in a circumferential groove that constitutes the weld joint using the pulsed gas metal arc welding process. This extends the life of the track bushing by eliminating wear grooves created by dirt and debris that become attracted to the abraded and corroded areas in the weld joint. With less dirt and debris, the ends of the track bushing that slide against the sealing surface of a track seal will remain intact longer by not forming wear grooves. It is these wear grooves that cause oil to leak out of the pin joint assembly that leads to an eventual failure of the pin joint.

Other aspects, objects and advantages of this invention can be obtained from a study of the drawings, the disclosure and the appended claims.

What is claimed is:

1. A track bushing, for an endless track of a track-type machine, comprising:
 a cylindrical tubular shape having a first end and a second end and a longitudinal axis;
 a first end bearing surface adjacent said first end and a second end bearing surface adjacent said second end;
 a circumferential groove formed in at least one of said first end bearing surface and said second end bearing surface, said circumferential groove having a depth along said longitudinal axis; and
 an abrasion and corrosion resistant material deposited by arc weld within said circumferential groove of said track bushing.

2. The track bushing, as set forth in claim 1, wherein said abrasion and corrosion resistant material is stainless steel.

3. The track bushing, as set forth in claim 1, wherein said abrasion and corrosion resistant material is martensitic stainless steel.

4. A process for making a corrosion resistant track bushing for an endless track of a track-type machine, comprising the steps of:
 providing a track bushing, having a cylindrical tubular shape and a longitudinal axis, with a first end and a second end and a first end bearing surface adjacent said first end and a second end bearing surface adjacent said second end;
 forming a circumferential groove in at least one of said first end bearing surface and said second end bearing surface, said circumferential groove having a depth along said longitudinal axis; and
 arc welding an abrasion and corrosion resistant material within said depth of said circumferential groove of said track bushing.

5. The process, as set forth in claim 4, wherein said step of arc welding is gas arc welding.

6. The process, as set forth in claim 4, wherein said step of arc welding is gas metal arc welding.

7. The process, as set forth in claim 4, wherein said step of arc welding is pulsed gas metal arc welding.

8. The process, as set forth in claim 7, wherein said abrasion and corrosion resistant material is stainless steel.

9. The process, as set forth in claim 7, wherein said abrasion and corrosion resistant material is martensitic stainless steel.

10. A process for making a corrosion resistant track bushing for an endless track of a track-type machine, comprising the steps of:
 providing a track bushing, having a cylindrical tubular shape and a longitudinal axis, with a first end and a second end and a first end bearing surface adjacent said first end and a second end bearing surface adjacent said second end;
 forming a circumferential groove in at least one of said first end bearing surface and said second end bearing surface, said circumferential groove having a depth along said longitudinal axis;
 gas tungsten arc welding an abrasion and corrosion resistant material within said depth of said circumferential groove of said track bushing.

11. A process for making a corrosion resistant track bushing for an endless track of a track-type machine, comprising the steps of:
 providing a track bushing, having a cylindrical tubular shape and a longitudinal axis, with a first end and a second end and a first end bearing surface adjacent said first end and a second end bearing surface adjacent said second end;
 forming a circumferential groove in at least one of said first end bearing surface and said second end bearing surface, said circumferential groove having a depth along said longitudinal axis;
 welding an abrasion and corrosion resistant material within said circumferential groove of said track bushing by pulsed gas metal arc; and
 adjusting a pulsed gas metal arc welder to provide a wire feed speed between 200 to 400 inches per minute.

12. A process for making a corrosion resistant track bushing for an endless track of a track-type machine, comprising the steps of:

provide a track bushing, having a cylindrical tubular shape and a longitudinal axis, with a first end and a second end and a first end bearing surface adjacent said first end and a second end bearing surface adjacent said second end;

forming a circumferential groove in at least one of said first end bearing surface and said second end bearing surface, said circumferential groove having a depth along said longitudinal axis;

welding an abrasion and corrosion resistant material within said circumferential groove of said track bushing by pulsed gas metal arc; and adjusting a pulsed gas metal arc welder to provide a peak voltage between 26 to 35.5 volts, peak current between 380 to 430 amperes, and background current between 70 to 150 amperes.

13. A process for making a corrosion resistant track bushing for an endless track of a track-type machine, comprising the steps of:

providing a track bushing, having a cylindrical tubular shape and a longitudinal axis, with a first end and a second end and a first end bearing surface adjacent said first end and a second end bearing surface adjacent said second end;

forming a circumferential groove in at least one of said first end bearing surface and said second end bearing surface, said circumferential groove having a depth along said longitudinal axis;

welding an abrasion and corrosion resistant material within said circumferential groove of said track bushing by pulsed gas metal arc; and adjusting a pulsed gas metal arc welder to provide a range of pulses per second between 90 to 210 and a pulse width between 2.0 to 2.7 milliseconds.

* * * * *